US012687991B2

(12) United States Patent
Hamada

(10) Patent No.: US 12,687,991 B2
(45) Date of Patent: Jul. 21, 2026

(54) IMAGE FORMING APPARATUS AND CONTROL METHOD FOR MANAGING A JOB HISTORY

(71) Applicant: CANON KABUSHIKI KAISHA, Tokyo (JP)

(72) Inventor: Yoshinobu Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 18/516,065

(22) Filed: Nov. 21, 2023

(65) Prior Publication Data

US 2024/0176558 A1 May 30, 2024

(30) Foreign Application Priority Data

Nov. 24, 2022 (JP) ................................. 2022-187072

(51) Int. Cl.
*G06F 3/12* (2006.01)

(52) U.S. Cl.
CPC ............ *G06F 3/121* (2013.01); *G06F 3/1273* (2013.01)

(58) Field of Classification Search
CPC ....... G06F 3/121; G06F 3/1273; G06F 3/1234
See application file for complete search history.

(56) References Cited

U.S. PATENT DOCUMENTS

2006/0289625 A1* 12/2006 Tamune ................... G09B 1/00
  235/375
2008/0137126 A1* 6/2008 Yoshida .................... G06F 3/12
  358/1.14

2012/0290601 A1* 11/2012 Huang ................. G06V 30/416
  707/E17.045
2014/0036311 A1* 2/2014 Sato ...................... G06F 3/1273
  358/1.15
2016/0171352 A1* 6/2016 Shinohara ............... G06F 3/121
  358/1.14
2019/0235815 A1* 8/2019 Takagi ................... G06F 3/1273
2022/0174177 A1* 6/2022 Watanabe .......... H04N 1/00949
2022/0291883 A1* 9/2022 Uruma ................. G06F 3/1273

FOREIGN PATENT DOCUMENTS

JP  2013037548 A  2/2013

* cited by examiner

*Primary Examiner* — Juan M Guillermety
(74) *Attorney, Agent, or Firm* — Canon U.S.A., Inc. IP Division

(57) ABSTRACT

An image forming apparatus that executes a job for output processing of image data includes a storage unit configured to store job information about an executed job and image data corresponding to an output based on the job as a job history corresponding to the job, and a recording unit configured to record information about an error that has occurred when the job history is stored, wherein, in conversion processing for storing the image data in an image format with text information as the job history, when an error occurs in the processing of a part of pages included in a target job, the storage unit stores image data corresponding to the job in the job history in a predetermined format different from the image format with the text information, and the recording unit records information about the part of the pages as the information about the error.

7 Claims, 10 Drawing Sheets

```
<ServerInformation>
     <URL>http://123.45.67.89/image-logs</ServerURL>
     <UserName>user1</UserName>
     <Password>HTmA82HSDmhr976pibjzBDSdklrnq</Password>
</ServerInformation>
<AgentInformation>
     <AgentStatus>
          <Status>
               <InternalError>
                    <Detail>
                         <JobID>001011</JobID>
                         <ErrorPage>3,8</ErrorPage>
                    </Detail>
               </InternalError>
               <RebootRequired></RebootRequired>
          </Status>
          <LastRegistrationResult>Success</LastRegistrationResult>
     </AgentStatus>
     <TransferSchedule>
          <TransferStartTime>23:00</TransferStartTime>
     </TransferSchedule>
</AgentInformation>
```

```
<ServerInformation>
     <URL>http://123.45.67.89/image-logs</ServerURL>
     <UserName>user1</UserName>
     <Password>HTmA82HSDmhr976pibjzBDSdkIrnq</Password>
</ServerInformation>
<AgentInformation>
     <AgentStatus>
          <Status>
               <InternalError></InternalError>
          </Status>
          <LastRegistrationResult>Success</LastRegistrationResult>
     </AgentStatus>
     <TransferSchedule>
          <TransferStartTime>23:00</TransferStartTime>
     </TransferSchedule>
</AgentInformation>
```

IMAGE FORMING APPARATUS AND CONTROL METHOD FOR MANAGING A JOB HISTORY

BACKGROUND

Field of the Disclosure

The present disclosure relates to a technique for managing a job history of a job executed on an image forming apparatus.

Description of the Related Art

An image forming apparatus, such as a printing apparatus or a digital multi-function peripheral, executes jobs involving image output, such as printing, copying, or facsimile transmission. The image forming apparatus has a function of storing and managing, as a history, job information indicating when a job has been executed by whom and using which apparatus, and what kind of job has been executed, for each executed job, and a job image which is image data output by the job.

When executing a job, the image forming apparatus converts image data into a dedicated image format suitable for the processing. For example, in the case of a print job, the image forming apparatus handles the print job in an image format dedicated to printing to achieve optimum image quality and speed for printing on paper. Then, the image forming apparatus transmits the job image in the dedicated image format and the job information to a job history server as a job history.

The job history server has a function of converting a dedicated image format of the job image received from the image forming apparatus into a general-purpose file format, such as a Portable Document Format (PDF) or Joint Photographic Experts Group (JPEG), and storing the converted job image in an external storage device, such as a file server. An inspector can inspect whether a general user is properly using the image forming apparatus by searching and examining the job history stored in the file server or the like.

In the related art discussed in Japanese Patent Application Laid-Open No. 2013-037548, a job history inspection system includes an image forming apparatus and an information processing apparatus. The image forming apparatus transmits a job image and job information to a job history server as a job history, and the job history server stores the job history in a storage device.

In recent years, in a job history inspection system, it has been devised to extract text information by subjecting a job image to optical character recognition/reader (OCR), convert the image and the text together into an image format with text information, such as searchable PDF, and store the image as a job history. However, when a job image is very complicated, the limitation of the OCR capability of the image forming apparatus is exceeded. Thus, conversion into searchable PDF fails, and the job image cannot be stored as a job history in some cases. For this reason, the history in which a part of information is lost is recorded.

SUMMARY

According to embodiments of the present disclosure, an image forming apparatus that executes a job for output processing of image data includes a storage unit configured to store job information about an executed job and image data corresponding to an output based on the job as a job history corresponding to the job, and a recording unit configured to record information about an error that has occurred when the job history is stored, wherein, in conversion processing for storing the image data in an image format with text information as the job history, when an error occurs in the processing of a part of pages included in a target job, the storage unit stores image data corresponding to the job in the job history in a predetermined format different from the image format with the text information, and the recording unit records information about the part of the pages as the information about the error.

Further features of the present disclosure will become apparent from the following description of exemplary embodiments with reference to the attached drawings.

BRIEF DESCRIPTION OF THE DRAWINGS

FIG. 2 is a block diagram illustrating an example of a hardware configuration.

FIG. 4 is an example of a configuration file.

FIGS. 9A and 9B are examples of various files in the second exemplary embodiment.

DESCRIPTION OF THE EMBODIMENTS

Hereinafter, exemplary embodiments of the present disclosure will be described with reference to the drawings.

Figure 1:
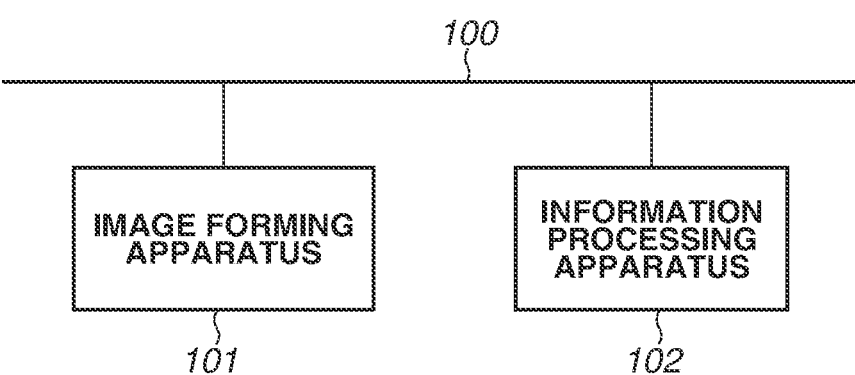
FIG. 1 is a block diagram illustrating an overall configuration of a system.

FIG. 1 is an overall configuration diagram of a system according to a first exemplary embodiment of the present disclosure. An image forming apparatus 101 and an information processing apparatus 102 are connected to a network 100 and can communicate with each other.

In the present exemplary embodiment, a single apparatus is described for each of the two apparatuses, but a plurality of apparatuses may be connected to the network 100. Further, functions of the image forming apparatus 101 and the information processing apparatus 102 may be configured on the same apparatus.

The image forming apparatus 101 has functions, such as scan, print, copy, FAX, and transmission, and executes a job in response to a user operation. The image forming apparatus 101 also has a history management function of generating job information and a job image in a dedicated format after or in parallel with execution of the job, and storing them as a job history in a storage device. In the job history, one record is managed in association with one job. In each record, information necessary for inspection, such as the execution date and time of a job, identification information about the job, a job type (printing, copying, or the like), and the content of the job, is recorded.

The image forming apparatus 101 also has a function of converting a job image in the dedicated format stored using the history management function into a searchable Portable Document Format (PDF) file and storing the file together with job information as a job history. Searchable PDF data refers to PDF data in which a text search can be performed by, for example, attaching transparent text data to an image included in the PDF data. Here, in creating the text data, character information is automatically created from a scanned image by applying a character recognition technique, such as optical character recognition (OCR), to original data. Further, the image forming apparatus 101 transmits the job history to the information processing apparatus 102 (to be described below) registered in advance.

In order to implement these functions, the image forming apparatus may be a digital multi-function peripheral (MFP). Further, in the present exemplary embodiment, a function for implementing processing according to the present disclosure, which will be described below with reference to a flowchart, is described as a standard function of the image forming apparatus. However, the function may be a function provided in the form of an extension application or a library that can be installed in the image forming apparatus.

The information processing apparatus 102 is a file server having a file sharing function. For example, a file sharing function, such as Web-based Distributed Authoring and Versioning (WebDAV) or Server Message Block (SMB), may be used. Alternatively, the file sharing function may be implemented by installing an application (not illustrated).

The image forming apparatus 101 transmits the job history to the information processing apparatus 102 and stores the job history in a predetermined shared folder. The image forming apparatus 101 also transmits setting values and status information and stores them in a predetermined shared folder.

Here, a configuration may be applied where the information processing apparatus 102 or another information processing apparatus (not illustrated) may include an external application (not illustrated) for displaying a setting value or a status stored in the shared folder or searching for a job history.

The network 100 is a connection line for communicably connecting the image forming apparatus 101 and the information processing apparatus 102 to each other, and a local area network (LAN), a wide area network (WAN), or a wireless communication network is used as the network 100. Alternatively, the Internet may be used.

Figure 2:
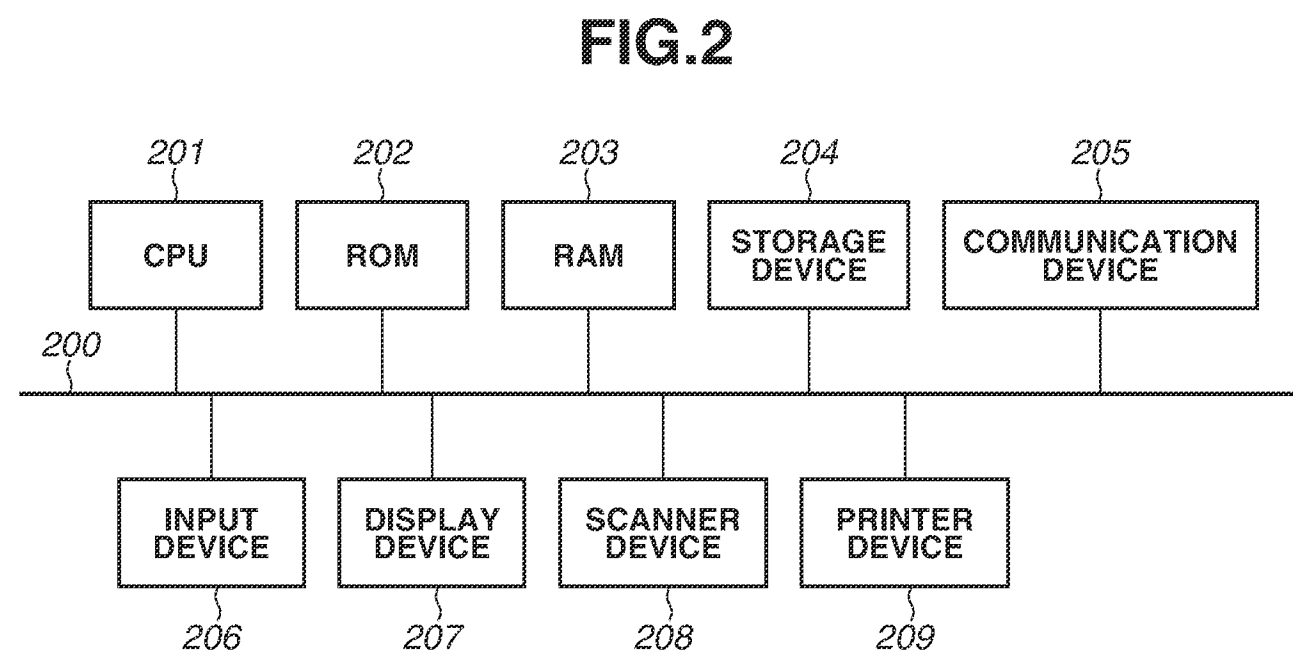

FIG. 2 is a block diagram illustrating an example of a hardware configuration of the image forming apparatus 101 and the information processing apparatus 102 illustrated in FIG. 1. A hardware configuration of a general information processing apparatus can be applied to the image forming apparatus 110 and the information processing apparatus 102 according to the present exemplary embodiment.

A central processing unit (CPU) 201 integrally controls the entirety of each piece of hardware, and controls each unit connected to a bus 200 to execute each function, such as printing and scanning. A read-only memory (ROM) 202 is a memory from which data is readable, and stores, for example, a basic control program of the image forming apparatus and a program for implementing processing according to the present exemplary embodiment. A random access memory (RAM) 203 is a memory from and to which data is readable and writable, and is used as a working memory of the CPU 201, for example.

A storage device 204 is used as a storage area for temporary data during execution of each program and permanent data. For example, a hard disk drive (HDD) or a solid-state drive (SSD) is often used as the storage device 204, but the storage device 204 may be a device in which an external medium, such as a compact disc (CD), a digital versatile disc (DVD), or a memory card, can be loaded to read and write data. A program for implementing the processing according to the present exemplary embodiment may be managed by the storage device 204.

A communication device 205 connects the image forming apparatus 101 and the information processing apparatus 102 to, for example, a LAN, and enables data communication by Transmission Control Protocol/Internet Protocol (TCP/IP) between the apparatuses. An input device 206 is an operation unit for receiving an input operation of characters and data by a user. Examples thereof include a keyboard, a mouse, a hard key, and a touch panel. A display device 207 is a device for displaying various screens, and is, for example, a liquid crystal display or a touch panel. The user issues an instruction via the input device 206 on a user interface screen displayed on the display device 207 and issues a job execution instruction and a setting instruction to the image forming apparatus 101.

In addition, a scanner device 208 and a printer device 209 are connected to the image forming apparatus 101 via the bus 200.

Figure 3:
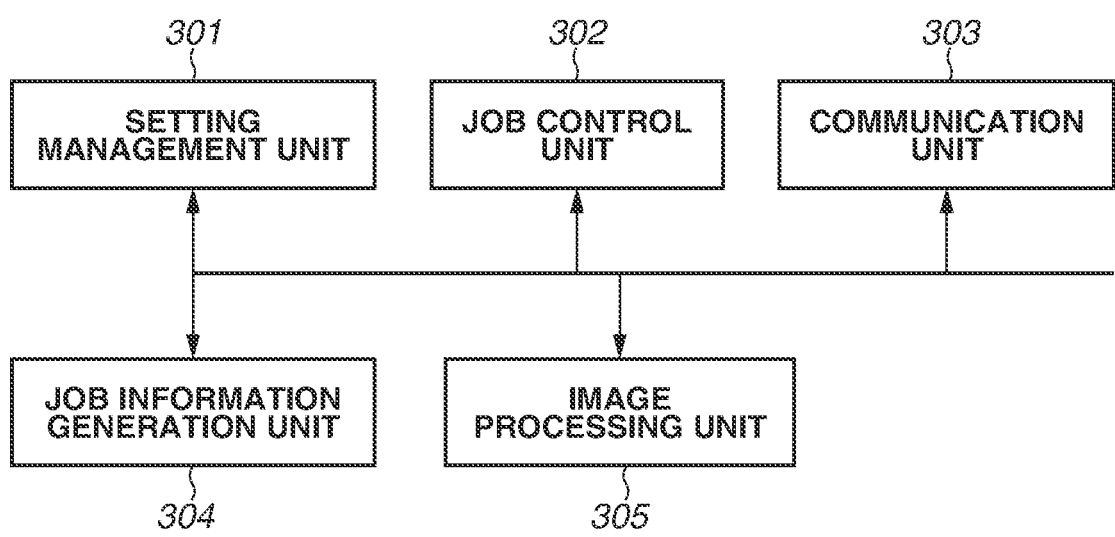
FIG. 3 is a block diagram illustrating an example of a software configuration of an image forming apparatus.

FIG. 3 is a block diagram illustrating an example of a software configuration of the image forming apparatus 101. Software components illustrated in FIG. 3 are implemented by the CPU 201 reading a program according to the present exemplary embodiment stored in, for example, the ROM 202 to the RAM 203 and executing the program.

A setting management unit 301 stores settings related to execution of various functions of the image forming apparatus 101 in each storage device, such as the RAM 203 or the storage device 204, and reads the settings from each storage device. Here, the settings include, for example, a copy setting for executing a copy function, a print setting for executing a print function, and a network setting. The settings also include a setting of whether to generate job information or a job image at the time of job execution, and connection information to a shared folder of the information processing apparatus 102 serving as a transmission destination of the job history.

Here, the connection information is information for transmitting a file to the shared folder of the information processing apparatus 102. More specifically, in a case where the shared folder of the information processing apparatus 102 is shared by WebDAV, a Uniform Resource Locator (URL), a domain name, a username, and a password for connecting to the folder by the WebDAV protocol are included in the connection information. Alternatively, in a case where the shared folder of the information processing apparatus 102 is shared by SMB, a folder path, a domain name, a username, a password, or the like for connecting to the folder via the SMB protocol is included in the connection information. Alternatively, it may be information for connection by another method.

Further, the setting management unit 301 manages and stores status information in addition to the settings. The status information includes, for example, whether the image forming apparatus 101 is operating normally and, if an error or a warning has occurred, the contents thereof. The setting management unit 301 periodically transmits setting information and the status information in the form of a setting file and a status file (to be described below) to the shared folder of the information processing apparatus 102 via a communication unit 303. In the present exemplary embodiment, although the setting of the connection information to the shared folder of the transmission destination of the job history is used when the setting information and the status information are transmitted, connection information for arranging a setting file and a status file, which will be described below, may be separately held. If the setting management unit 301 detects a change in status due to an error or the like in a job information generation unit 304, the setting management unit 301 updates the setting information and the status information stored in the storage device 204. Further, the setting information and the status information transmitted to the information processing apparatus 102 are also updated.

A job control unit 302 controls the scanner device 208 and the printer device 209 to execute various jobs based on a job execution request input via the input device 206 or received by the communication unit 303. For example, in the case of a job for storing a reprintable document, a print job received by the communication unit 303 from a personal computer (PC) (not illustrated) is converted into a format for printing and stored in the storage device 204. In response to a user instruction via the input device 206 of the image forming apparatus 101, a job for printing the stored reprintable document is executed.

The communication unit 303 receives, for example, a print job and a job execution request from an information processing apparatus (for example, a PC having a print client function) (not illustrated).

The job information generation unit 304 generates job information and a job image in the dedicated format via an image processing unit 305 after job execution by the job control unit 302 or in parallel with the job execution and stores them in the storage device 204. Further, the job information generation unit 304 converts the job image in the dedicated format stored in the storage device 204 into searchable PDF data via the image processing unit 305 and stores the searchable PDF data in the storage device 204 as a job history together with the job information.

Further, the stored job history is transmitted to the information processing apparatus 102 via the communication unit 303.

In response to a request from the job control unit 302, the image processing unit 305 executes image processing on image data associated with job execution. In response to a request from the job information generation unit 304, the image processing unit 305 performs OCR processing on a job image in the dedicated format, which is image data used for a job, to extract text information, and the job image is converted into searchable PDF data. The image processing unit 305 may perform processing, such as conversion into another image format, resolution conversion for reducing image data size, and image quality reduction processing.

Next, a file transmitted by the image forming apparatus 101 and stored in the shared folder on the information processing apparatus 102 will be described. An example in which four image forming apparatuses 101 output setting information, status information, and a job history as files on a shared folder of one information processing apparatus 102 will be described.

To output the files to the shared folder, the setting management unit 301 and the job information generation unit 304 of the image forming apparatus 101 communicate with the communication unit 303 of the information processing apparatus 102 via the communication unit 303 of the image forming apparatus 101 and store the files in the storage device 204 of the information processing apparatus 102. In the present exemplary embodiment, an example in which the files are stored in the shared folder will be described. However, in a case where a database (not illustrated) is constructed on the information processing apparatus 102, similar information may be stored in the database.

Table 4-1 is an example of a status file indicating status information stored in the shared folder on the information processing apparatus 102. The status file is a file expressing typical errors and warnings by file names so that they can be listed by an operating system (OS) standard function, such as Windows Explorer. Table 4-1 illustrates an example of status files of four image forming apparatuses whose serial numbers are printer001, printer002, printer003, and printer004, respectively.

TABLE 4-1

| Row Number in Table 4-1 | Status File Name |
|---|---|
| 411 | 1. Error__InternalError__printer001 |
| 412 | 2. Warning__LowFreeSpace__printer003 |
| 413 | 3. Normal__OK__printer002 |
| 414 | 3. Normal__OK__printer004 |

Row number 411 indicates that an error "InternalError" (an internal error) has occurred in the image forming apparatus having the serial number "printer001". Row number 412 indicates that a warning "LowFreeSpace" (the free space of the area for storing the job history is small) has occurred in the image forming apparatus having the serial number "printer003". Row numbers 413 and 414 indicate that the image forming apparatuses having the serial numbers "printer002" and "printer004", respectively, are operating normally. By giving a prefix, such as "1. Error", "2. Warning", or "3. Normal", to each file name, the files can be sorted by the file name by Windows Explorer, and the listing property can be further improved. The contents of the status file may be empty or may be a program file or a URL file for accessing a management screen of the corresponding image forming apparatus 101.

There is a possibility that a plurality of errors or warnings treated as the status information may occur simultaneously. However, if all of them are attached to a file name, the file name becomes long, and the listing property is deteriorated. Thus, in the present exemplary embodiment, only a representative status is used as the file name of the status file in accordance with a predetermined priority (for example, priority is given to an error status over a warning status).

On the other hand, since only the representative status is recognizable from the status file, the image forming apparatus 101 separately holds details of the status information as detailed status information in the setting management unit 301, and the information is also stored in the shared folder on the information processing apparatus 102. The detailed status information may be stored in a separate file or may be described in the status file. In the present exemplary embodiment, a mode in which the detailed status information is included in a setting file to be described below will be described. The detailed status information includes all the generated statuses and detailed information associated with the statuses.

Table 4-2 is an example of the setting file stored in the shared folder on the information processing apparatus 102. Similar to Table 4-1, Table 4-2 illustrates an example of the setting files of the four image forming apparatuses whose serial numbers are printer001, printer002, printer003, and printer004, respectively.

TABLE 4-2

| Row Number in Table 4-2 | Setting File Name |
| --- | --- |
| 421 | Info_printer001.xml |
| 422 | Info_printer002.xml |
| 423 | Info_printer003.xml |
| 424 | Info_printer004.xml |

The contents of the setting file include setting information managed by the setting management unit 301 and the detailed status information. The setting file is described in, for example, Extensible Markup Language (XML), and each setting item and detailed status information are described in tags.

FIG. 4 illustrates an example of the setting information and the detailed status information described in a setting file "Info_printer001.xml" in row number 421.

In the example of FIG. 4, from the contents of the elements described in the "Status" tag, the statuses of "InternalError" (an internal error) and "RebootRequired" (restart is necessary) are generated.

As for "InternalError" (an internal error), there is a "Detail" tag representing detailed information as a contained element, and there are a "JobID" tag and an "ErrorPage" tag as further contained elements. In the present exemplary embodiment, these tags are output when an error occurs in processing for converting a job image into a job history image. A job identifier (ID) of job information with which an error has occurred is output as a content of the "JobID" tag. As a content of the "ErrorPage" tag, a page number of a page missing from the searchable PDF data due to a conversion failure is output, and when a plurality of pages is missing, page numbers are output with comma separation. The example of FIG. 4 indicates that an error has occurred in the conversion of a third page and an eighth page in the job history of JobID "001011" and these pages are lost from the searchable PDF data.

The elements of the "Detail" tag continue to be accumulated each time an error occurs, and there is a possibility that the setting file may be enlarged. Thus, deletion may be performed at a timing when the image forming apparatus 101 is restarted, a timing when a date is changed, a timing when a predetermined period has elapsed, or the like.

Tables 4-3 and 4-4 are examples of the job history stored in the shared folder on the information processing apparatus 102. In the present exemplary embodiment, the job history includes a plurality of files, and one job history is stored in the shared folder as a folder including the plurality of files. Table 4-3 illustrates folders (to be referred to as job history folders hereinafter) each representing one job history, and Table 4-4 illustrates job history files arranged in the job history folders. Data stored as a job history on the image forming apparatus 101 is also stored in the same arrangement as the files in the job history folder illustrated in Table 4-4.

TABLE 4-3

| Row Number in Table 4-3 | Job History Folder Name |
| --- | --- |
| 431 | printer001_001010 |
| 432 | printer002_002003 |
| 433 | printer004_004126 |
| 434 | printer001_001011 |
| . . . | . . . |

TABLE 4-4

| Row Number in Table 4-4 | Job History File Name |
| --- | --- |
| 441 | JobInfo.xml |
| 442 | JobImage.pdf |
| 443 | ImageInfo.xml |
| 444 | Complete |
| 445 | P00003.jpg |
| 446 | P00008.jpg |
| 447 | P00003.xml |
| 448 | P00008.xml |

The job history folder name illustrated in Table 4-3 includes a serial number of the image forming apparatus in which the job history is generated and a job ID for specifying the job. For example, a job history in row number 431 is generated by an image forming apparatus "printer001" and has a job ID "001010".

In Table 4-4, job information is recorded in "JobInfo.xml" in row number 441. Thus, it is possible to check when and where a job has been executed by whom, and what kind of job has been executed. "JobImage.pdf" in row number 442 is a job image and is searchable PDF data in the present exemplary embodiment. "ImageInfo.xml" in row number 443 is information for the "JobImage.pdf" in the row number 442, and records, for example, a file format and a resolution. "Complete" in row number 444 is a file for indicating that storing of a set of job history files in the job history folder illustrated in Table 4-4 has been completed. For example, when an information processing apparatus (not illustrated) searches for or acquires a job history, only job histories in which "Complete" in the row number 444 exists can be set as operation targets.

When the information processing apparatus (not illustrated) acquires a job history from the shared folder and deletes the job history, the information processing apparatus may notify the image forming apparatus 101 of the job ID of the job history to be deleted. Upon receiving a notification, the image forming apparatus 101 may delete the status information associated with the job ID if the notified job ID is held in the detailed status information.

"P00003.jpg" in row number 445 and "P00008.jpg" in row number 446 are image files of pages that have failed to be converted into searchable PDF data and have been omitted from "JobImage.pdf" and converted into JPEG. "P00003.xml" in row number 447 and "P00008.xml" in row number 448 are information for files in row numbers 445 and 446, respectively, and for example, file formats and resolutions are recorded. The files in the row numbers 445 to 448 are files which are not generated when there is no page for which conversion into the searchable PDF data has failed, i.e., when all pages are normally converted into the searchable PDF data. These files may be arranged in a sub-folder in the job history folder so as to be distinguished from files in the case where the conversion is normally performed.

Figure 5:
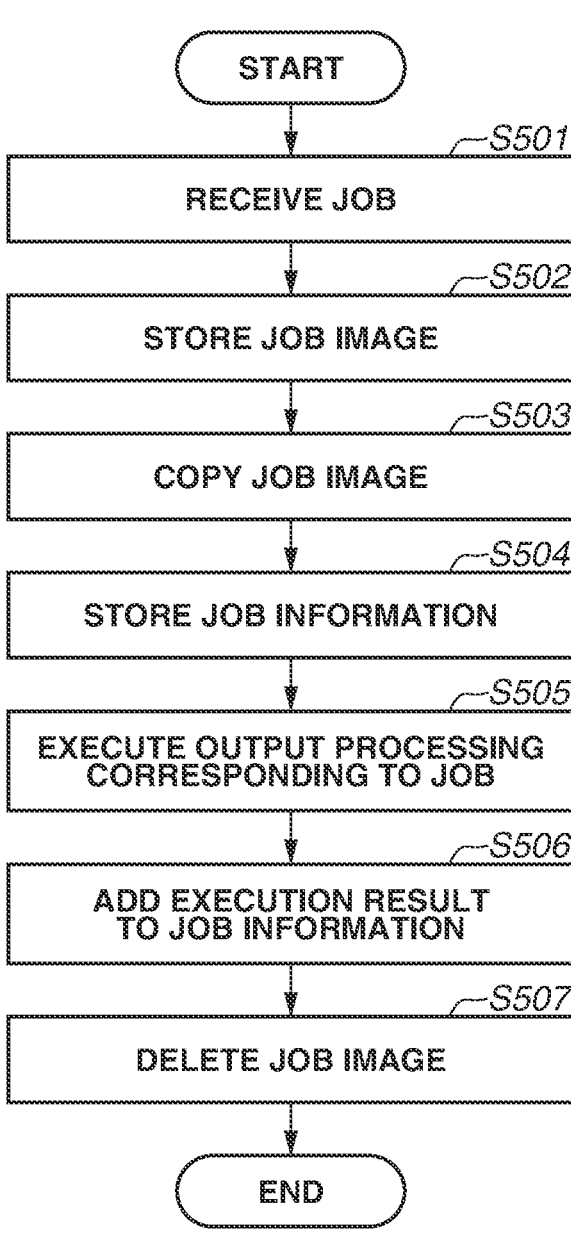
FIG. 5 is a flowchart illustrating job execution processing of the image forming apparatus according to a first exemplary embodiment.

FIG. 5 is a flowchart illustrating processing in the image forming apparatus 101 when a job is received. The processing is started, for example, when a print job is input from a PC (not illustrated) or when a job execution instruction is issued from a user via the input device 206. Each step illustrated in FIG. 5 is implemented when the CPU 201 of the image forming apparatus 101 reads a program of each software component illustrated in FIG. 3 stored in the ROM 202 or the storage device 204 into the RAM 203 and executes the program. In addition, the scanner device 208, the printer device 209, or the like illustrated in FIG. 2 is used depending on the type of job or the like.

In step S501, the job control unit 302 receives a job. In step S502, the job control unit 302 acquires image data (job image) to be output in the job from the job in step S501 and stores the image data in the dedicated format in the storage device 204. The dedicated format is not limited to one type of format and may be a different format depending on a job to be executed. A general-purpose format can also be used as long as it is a file format that can be used when an image is formed.

In step S503, the job control unit 302 copies the job image stored in step S501 via the job information generation unit 304 and stores the copied job image in the storage device 204 as a job history conversion target image. The job image and the job history conversion target image may be stored in different areas of the storage device 204 or may be stored in the same area thereof.

In step S504, the job control unit 302 generates job information via the job information generation unit 304 and stores the job information in the storage device 204. Table 5-1 illustrates an example of the job information.

TABLE 5-1

| Job Information | Job ID | 001000 |
| | Job Type | Print |
| | Execution Date and Time | 2022 Jun. 6 |
| | Number of Pages | 10 |
| | Document Information ID | Doc0000A |
| | Execution Result | 0 |
| | . . . | |
| Authentication Setting | Account Name | User A |
| | Password | AAA |
| | . . . | |
| Device Information | Device Name | printer X |
| | Device Management Number | printer001 |
| | Installed Location | Headquarters |
| | . . . | |

The job information is generated for each executed job. For example, a job ID, such as "001000", is assigned to the job information as information capable of specifying the job.

In addition, the type of job operation performed by the user is stored as the job type. In the example of Table 5-1, the type of job is "Print". The date and time when the job is executed is stored as "Execution Date and Time", and the number of pages "10" of the document used in the job is stored as "Number of Pages". "Document Information ID" is an ID for identifying the job image and the job history conversion target images and is "Doc0000A" in the example of Table 5-1. Images for a plurality of pages may be associated with "Doc0000A".

In "Authentication Setting", a username and password of the user who executed the job are stored. In addition, information about a domain name and an authentication method may be stored. In "Device Information", information about the image forming apparatus 101 that has executed the job is stored.

In step S505, the job control unit 302 executes output processing corresponding to the job. In the output processing, for example, in the case of a print job, printing is performed, and in the case of a scan transmission job, conversion of the job image stored in step S502 into an output image and transmission are performed in accordance with the settings.

In the scan transmission job, JPEG, searchable PDF, PDF not including text information, or the like can be designated as an image format in transmission, and a job image is converted into an output image by the image processing unit 305 in accordance with the designation. However, the job history conversion target image copied in step S503 is not affected by the conversion processing here and remains in the dedicated format.

In step S506, the job control unit 302 adds an execution result of step S505 to the job information. For example, an exit code indicating success or error. The number of printed pages, job execution end date and time, and the like may be added.

In step S507, when the job is completed, the job control unit 302 deletes the job image which is the copy source stored in step S502 from the storage device 204. The job history conversion target image stored in step S503 is not deleted.

Figure 6:
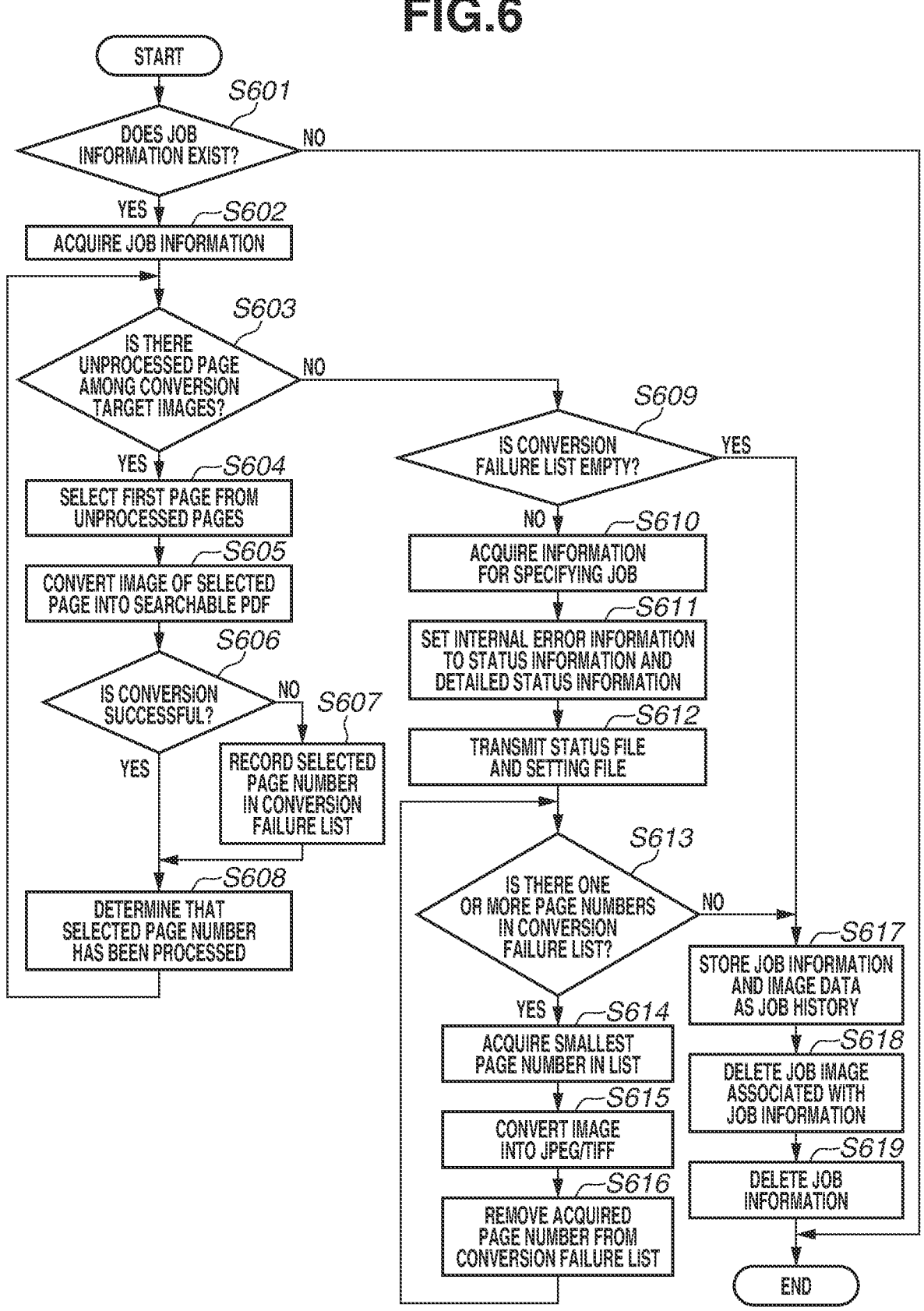
FIG. 6 is a flowchart illustrating job history generation processing of the image forming apparatus according to the first exemplary embodiment.

FIG. 6 is a flowchart illustrating job history generation processing performed by the image forming apparatus 101. Specifically, the job history conversion target image stored in step S503 is converted from the image in the dedicated format to searchable PDF data (also referred to as "SPDF"), and data to be stored as the job history is generated. The image forming apparatus 101 detects, via the job control unit 302, that the job execution illustrated in FIG. 5 has been completed and performs the processing of the flowchart. Alternatively, the job information generation unit 304 may periodically execute the present processing. Each step illustrated in FIG. 6 is implemented when the CPU 201 of the image forming apparatus 101 reads a program of each software component illustrated in FIG. 3 stored in the ROM 202 or the storage device 204 into the RAM 203 and executes the program.

In step S601, the job information generation unit 304 checks whether job information exists in the storage device 204. The job information contains the contents illustrated in Table 5-1 and is generated for each job. If the job information exists (YES in step S601), the processing proceeds to step S602, and if the job information does not exist (NO in step S601), the processing is terminated.

In step S602, the job information generation unit 304 acquires the job information. More specifically, the job history conversion target image indicated by the Document Information ID "Doc0000A" illustrated in Table 5-1 and information related to the image are acquired. The information related to the image includes, for example, a pointer value of the image, a resolution of the image, and a color mode and format information of the image. The job history conversion target image is the image that has been copied and stored in step S503.

In step S603, the job information generation unit 304 checks whether there is an unprocessed page among the job history conversion target images associated with the Document Information ID "Doc0000A". If there is an unprocessed page (YES in step S603), the processing proceeds to step S604, and if there is no unprocessed page (NO in step S603), the processing proceeds to step S609.

In step S604, the first page (the page with the smallest page number) is selected from unprocessed pages of the job history conversion target image.

In step S605, the job information generation unit 304 requests the image processing unit 305 to convert an image of a selected page of the job history conversion target image into searchable PDF data. At the time of the request, for example, a page number for specifying image data or a storage location of the converted image is designated. In addition, a post-conversion resolution for resolution conversion may be designated.

If searchable PDF data has already been generated for the job information to be processed, the converted image is added to the searchable PDF data. If the searchable PDF data has not been generated yet for the job information to be processed, searchable PDF data for the job information is newly generated, and the converted image is set as the first page of the searchable PDF data. The searchable PDF data generated as a result of processing by the image processing unit 305 is stored in the storage device 204 as converted image data.

In step S606, the job information generation unit 304 determines whether the conversion into searchable PDF data is successful. If the conversion is successful (YES in step S606), the processing proceeds to step S608. If the conversion has failed (NO in step S606), the processing proceeds to step S607.

In step S607, the job information generation unit 304 records the page number of the page that is the conversion target in step S605 in a conversion failure list, and the processing proceeds to step S608.

In step S608, the job information generation unit 304 determines that the page number of the page that is the conversion target in step S605 has been processed, and the processing returns to step S603.

In step S609, the job information generation unit 304 determines whether the conversion failure list used in step S607 is empty. If the conversion failure list is empty (YES in step S609), the processing proceeds to S617. If at least one page number is recorded in the conversion failure list (NO in step S609), the processing proceeds to step S610.

In step S610, the job information generation unit 304 acquires information for specifying a job from the job information acquired in step S602. Specifically, the job ID "001000" illustrated in Table 5-1 is acquired.

In step S611, the job information generation unit 304 sets the status of the internal error in the status information managed by the setting management unit 301 via the setting management unit 301. In addition, the status of the internal error and information associated with the internal error are set in the detailed status information. The status information may include the presence or absence of other errors or warnings in the image forming apparatus 101. In the detailed status information, the job ID acquired in step S610 and the page number included in the conversion failure list are set in addition to the status of the internal error. The detailed status information may include other information.

In step S612, the setting management unit 301 generates a setting file and a status file based on the status information and the detailed status information set in step S611 and transmits the setting file and the status file to the shared folder of the information processing apparatus 102 via the communication unit 303.

For example, as for the status file, if the internal error has the highest priority as the file name, a status file including "1. Error_InternalError" in the file name is generated and transmitted as indicated in the row number 411 in Table 4-1. At the time of transmission, if a status file having the same serial number already exists in the shared folder on the information processing apparatus 102, the status file is deleted. Alternatively, if a status file having the same serial number already exists, the existing file may be renamed to the name of the file to be transmitted, instead of transmitting the file.

Further, for example, regarding the detailed status information of the setting file, as illustrated in FIG. 4, a setting file in which information about "InternalError", "Detail", "JobID", and "ErrorPage" tags is set is generated and transmitted. At this time, the job ID acquired in step S610 is set in the contents of the element of the "JobID" tag, and the page number included in the conversion failure list is set in the contents of the element of the "ErrorPage" tag.

In the present exemplary embodiment, the setting management unit 301 generates and transmits the status file and the setting file each time. However, the setting management unit 301 may store the status file and the setting file in the storage device 204 and update and transmit the status file and the setting file.

The status file and the setting file transmitted in step S612 can be used to obtain information by referring to these files when an information processing apparatus (not illustrated) acquires a status concerning the job history. For example, the information processing apparatus (not illustrated) monitors the folder illustrated in Table 4-1, and periodically checks the status file. At this time, if an error or warning including a status of exceeding the number of pages is designated in the file name, the information processing apparatus (not illustrated) acquires the detailed status information from the setting file illustrated in FIG. 4. Based on the status and the detailed status information, the information processing apparatus (not illustrated) can notify an inspector of error information by e-mail transmission or the like. Based on the setting information of the image forming apparatus 101 described in the setting file, the information processing apparatus (not illustrated) may display a screen for referring to the setting information on the display device 207.

In step S613, the job information generation unit 304 determines whether there is one or more page numbers in the conversion failure list. If there is one or more page numbers (YES in step S613), the processing proceeds to step S614. If there is no page number (NO in step S613), the processing proceeds to step S617.

In step S614, the job information generation unit 304 acquires the smallest page number in the conversion failure list.

In step S615, the job information generation unit 304 requests the image processing unit 305 to convert the image of the page of the page number acquired in step S614. In the present exemplary embodiment, in the conversion request, as an image format having no text information, conversion into Tag Image File Format (TIFF) is requested when the target image is a binary image, and conversion into JPEG is requested when the target image is a multivalued image. However, designation of the image format into which the image is to be converted and a condition of the image format into which the image is to be converted are not limited thereto.

A TIFF or JPEG file generated as a result of the processing by the image processing unit 305 is stored in the storage device 204 as converted image data. At this time, an information file corresponding to the image file of the converted page is also generated and stored. For example, when the images of the third page and the eighth page are stored in JPEG, the files in the row numbers 445 to 448 illustrated in Table 4-4 are stored.

In step S616, the job information generation unit 304 removes the page number acquired in step S614 from the conversion failure list, and the processing returns to step S613.

In step S617, the job information generation unit 304 stores the job information acquired in step S602 and the converted image data stored in steps S605 and S615 in the storage device 204 in association with each other as a job history. At this time, "ImageInfo.xml" in the row number 443, which is the information for the job image illustrated in Table 4-4, is generated. Further, "ImageInfo.xml" is stored in the same folder together with the job information and the converted image data, and "Complete" in the row number 444, which is the file for indicating that storing of the set of job history files has been completed, is generated.

In step S618, the job information generation unit 304 instructs the image processing unit 305 to delete the job image (the job history conversion target image) associated with the job information acquired in step S602. Specifically, the Document Information ID "Doc0000A" is notified to the image processing unit 305, and the job image (the job history conversion target image) corresponding to the Document Information ID "Doc0000A" is deleted. In step S619, the job information generation unit 304 deletes the job information acquired in step S602.

Figure 7:
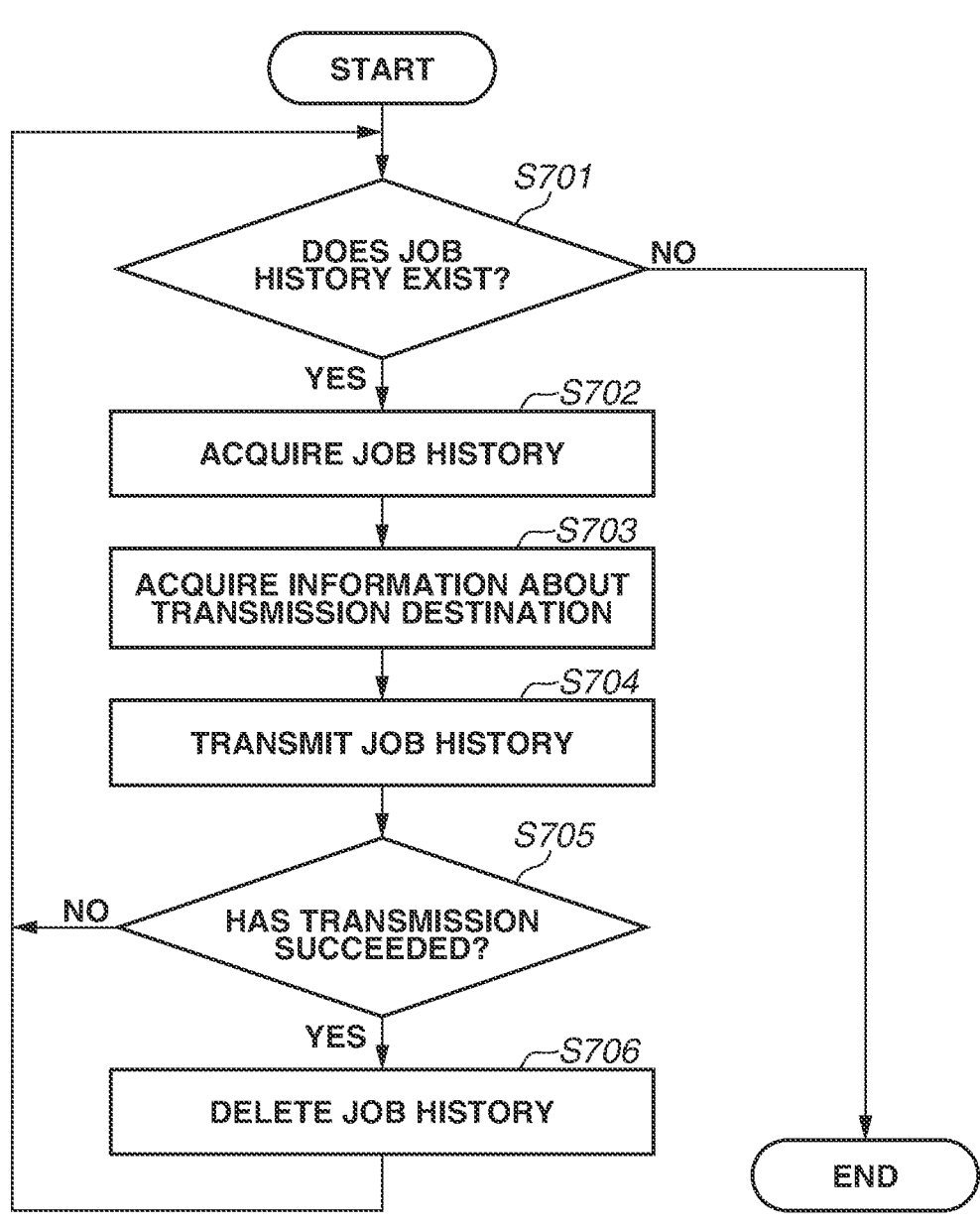
FIG. 7 is a flowchart illustrating job history transmission processing of the image forming apparatus according to the first exemplary embodiment.

FIG. 7 is a flowchart illustrating processing in which the job information generation unit 304 transmits a job history to the information processing apparatus 102. The processing is automatically executed periodically at predetermined intervals. Alternatively, a start timing of the processing may be set in the setting management unit 301, and the processing may be executed according to the setting.

In step S701, it is checked whether the job history stored in step S617 exists in the storage device 204. If the job history exists (YES in step S701), the processing proceeds to step S702, and if the job history does not exist (No in step S701), the transmission processing is terminated.

In step S702, the job information generation unit 304 acquires the job history whose presence has been confirmed in step S701 from the storage device 204. For example, a job history having the oldest job execution date and time is acquired.

In step S703, the job information generation unit 304 acquires, from the setting management unit 301, connection information to the shared folder of the information processing apparatus 102 serving as the transmission destination of the job history.

In step S704, the job information generation unit 304 transmits the job history acquired in step S702 to the shared folder of the information processing apparatus 102 via communication unit 303 based on the connection information acquired in step S703.

In step S705, the job information generation unit 304 confirms a transmission result of step S704. If the transmission has succeeded (YES in step S705), the processing proceeds to step S706, and if the transmission has failed (NO in step S705), the processing proceeds to step S701, and the transmission processing is performed again.

In step S706, the job information generation unit 304 deletes the job history transmitted in step S704 from the storage device 204.

The processing related to job history generation and transmission according to the first exemplary embodiment has been described above. According to the first exemplary embodiment, when there is a page the conversion of which into an image format with text information (for example, searchable PDF) has failed, image data can be saved in another format without text information (for example, JPEG or TIFF). This is intended to prevent the page from being lost because, when a conversion target image includes a complicated page that cannot be processed by the OCR capability of the image forming apparatus 101, the conversion into an image format with text information fails. Here, the case where the processing cannot be performed by the OCR capability includes a case where the processing cannot be performed within a predetermined time limit for one time of OCR processing.

This makes it possible to visually recognize, at the time of inspection, the contents of an image as an image without text information, even for information that otherwise is conventionally lost from a job history including unclear image data that has failed to be converted into searchable PDF data.

A second exemplary embodiment of the present disclosure will be described. In the present exemplary embodiment, information about a page number of a page the conversion of which into searchable PDF data has failed is recorded not in the detailed status information (setting file) but in the job history. The other parts are the same as those of the first exemplary embodiment, and thus only parts different from those of the first exemplary embodiment will be described.

Figure 8:
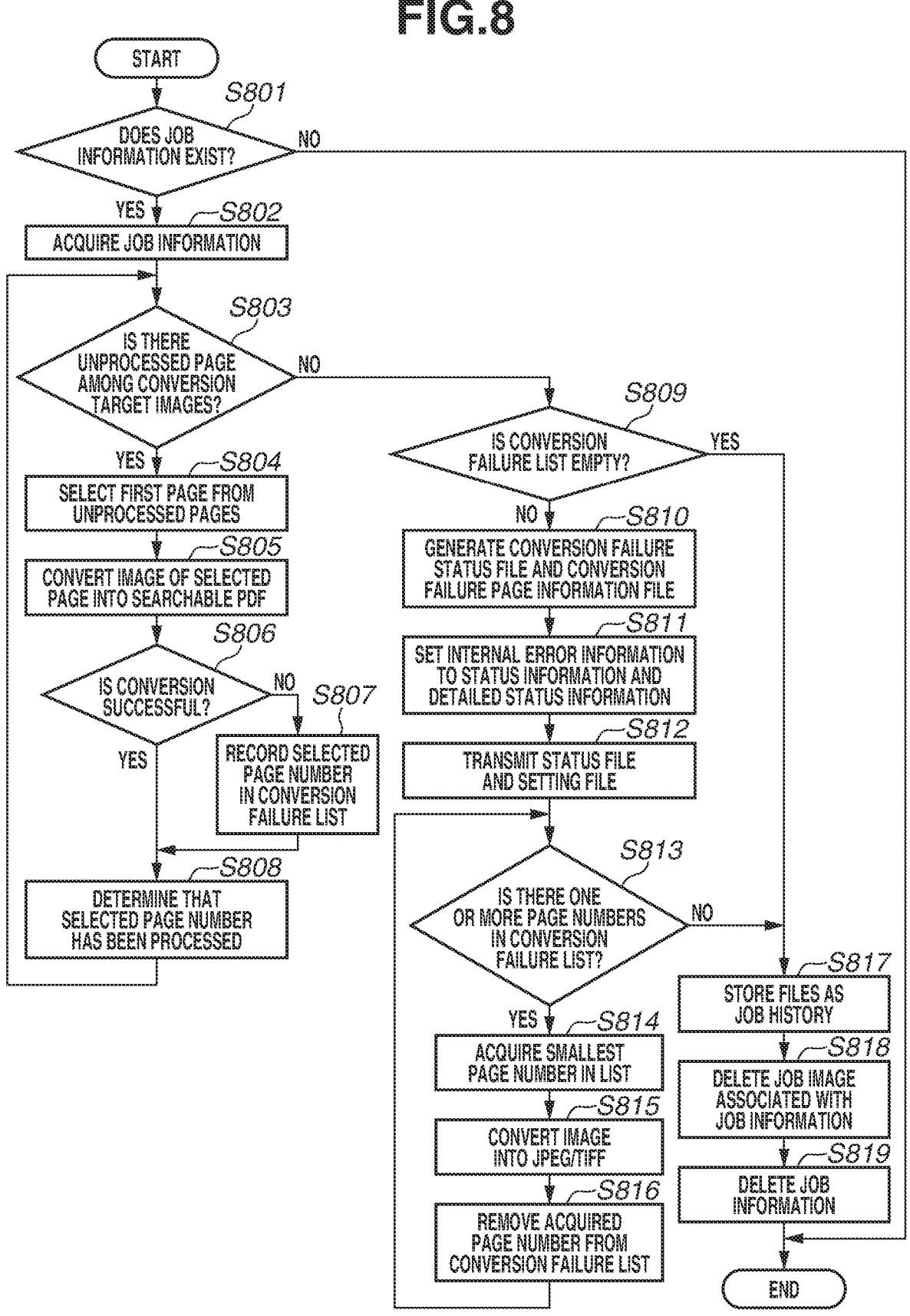
FIG. 8 is a flowchart illustrating a job history generation processing of the image forming apparatus according to a second exemplary embodiment.

FIG. 8 is a flowchart illustrating job history generation processing performed by the image forming apparatus 101 according to the second exemplary embodiment. Each step illustrated in FIG. 8 is implemented when the CPU 201 of the image forming apparatus 101 reads a program of each software component illustrated in FIG. 3 stored in the ROM 202 or the storage device 204 into the RAM 203 and executes the program. In FIG. 8, processes of steps S610, S611, and S617 are different from those of FIG. 6 of the first exemplary embodiment, and thus only the difference will be described.

Processes in steps S801 to S809 are the same as those in steps S601 to S609, and thus descriptions thereof will be omitted.

In step S810, the job information generation unit 304 generates a conversion failure status file and a conversion failure page information file. The conversion failure status file is a file for recording that there is a page the conversion of which into searchable PDF data has failed. The conversion failure page information file is a file in which page numbers of pages that have failed to be converted into searchable PDF data are recorded with comma separation. The information about the page numbers of pages the conversion of which into searchable PDF data has failed is the page number in the conversion failure list. For example, when the conversion into searchable PDF data has failed on the third page and the eighth page, a conversion failure page information file having the contents as illustrated in FIG. 9A is generated. The conversion failure page information file may include not only the page numbers but also information, such as an error code, when the conversion of each page fails. In the present exemplary embodiment, these files are separately generated. However, for example, these files may be generated as one file so that the conversion failure status file includes the page number(s) of the page(s) that has or have failed to be converted into searchable PDF data.

In step S811, the job information generation unit 304 sets a status of an internal error in the status information and the detailed status information managed by the setting management unit 301 via the setting management unit 301. The status information and the detailed status information may include the presence or absence of other errors and warnings in the image forming apparatus 101.

In the present exemplary embodiment, unlike the first exemplary embodiment, the detailed status information does not include the job ID of the job including a page the conversion of which into searchable PDF data has failed, and the information about the page number of the page the conversion of which has failed. This is because the conversion failure status file and the conversion failure page information file are stored in association with the job history of the job including a page the conversion of which into searchable PDF data has failed, and the information about the page number of the page the conversion of which has failed is output to the conversion failure page information file. However, these pieces of information may be included in the detailed status information.

In step S812, similar to step S612, the setting management unit 301 generates a setting file and a status file and transmits these files to the shared folder of the information processing apparatus 102 via the communication unit 303.

For example, as for the status file, in a case where the internal error has the highest priority as the file name, a status file including "1. Error_InternalError" as the file name is generated and transmitted, similarly to the row number 411 in Table 4-1. At the time of transmission, if a status file having the same serial number already exists in the shared folder on the information processing apparatus 102, the status file is deleted. Alternatively, if the status file having the same serial number already exists, the existing file may be renamed to the name of the file to be transmitted, instead of transmitting the file.

Further, for example, regarding the detailed status information in the setting file, as illustrated in FIG. 9B, a setting file in which information about an "InternalError" tag is set is generated and transmitted. In the present exemplary embodiment, unlike FIG. 4 according to the first exemplary embodiment, the setting file does not include information about the "Detail", "JobID", and "ErrorPage" tags since the job ID of the job including a page the conversion of which into searchable PDF data has failed, and the information about the page number of the page the conversion of which has failed are not included in the detailed status information. However, these pieces of information may be included in the detailed status information as in the first exemplary embodiment.

Processes in steps S813 to S816 are the same as those in S613 to S616, and thus descriptions thereof will be omitted.

In step S817, the job information generation unit 304 stores the conversion failure status file and the conversion failure page information file generated in step S617 as the job history in the storage device 204 in addition to the file stored in step S617 as the job history. Examples of the job history file stored at this time are illustrated in Tables 8-1 and 8-2.

TABLE 8-1

| Row Number in Table 8-1 | Job History File Name |
| --- | --- |
| 811 | JobInfo.xml |
| 812 | JobImage.pdf |
| 813 | ImageInfo.xml |
| 814 | Complete |

TABLE 8-2

| Row Number in Table 8-2 | Job History File Name |
| --- | --- |
| 821 | JobInfo.xml |
| 822 | JobImage.pdf |
| 823 | ImageInfo.xml |
| 824 | Complete |
| 825 | ImagingError |
| 826 | ErrorPageInfo.txt |
| 827 | P00003.jpg |
| 828 | P00008.jpg |
| 829 | P00003.xml |
| 830 | P00008.xml |

Table 8-1 is an example of the job history file stored when the conversion failure list is empty in step S809 (YES in step S809). The files in row numbers 811 to 814 in Table 8-1 are the same as the files in the row numbers 441 to 444 illustrated in Table 4-4, respectively, and a description thereof will be omitted.

Table 8-2 illustrates an example of the job history file stored when the conversion failure list is not empty (NO in step S809). The files in row numbers 821 to 824 in Table 8-2 are the same as the files in the row numbers 811 to 814 in Table 8-1, respectively, and a description thereof will be omitted.

In Table 8-2, in addition to these files, the conversion failure status file ("ImagingError" in row number 825) generated in step S810 and the conversion failure page information file ("ErrorPageInfo.txt" in row number 826) are included. For example, when an information processing apparatus (not illustrated) searches for or acquires a job history, the information processing apparatus can detect a job history in which "ImagingError" in the row number 825 exists and notify the inspector of the job history by e-mail transmission or the like.

At this time, the contents of "ErrorPageInfo.txt" in the row number 826 may be read, and the information about the page numbers of the pages the conversion of which have failed may be included in the notification.

Further, the job history of Table 8-2 also includes files in row numbers 827 to 830. These files are files of the pages (the third page and the eighth page in this example) that have been converted into JPEG in step S815 since the conversion thereof into searchable PDF has failed, and files of information corresponding to these pages. The files in the row numbers 827 to 830 are the same as the files in the row numbers 445 to 448 illustrated in Table 4-4, and descriptions thereof will be omitted. Note that some or all of the files in the row numbers 825 to 830 may be arranged in a subfolder provided in the job history folder.

Processes in steps S818 and S819 are the same as those in steps S618 and S619, and thus descriptions thereof will be omitted.

The processing related to the job history generation and the status management of conversion failure into searchable PDF according to the second exemplary embodiment has been described above.

The first and second exemplary embodiments are common to each other in that the image forming apparatus records the status indicating the conversion failure into searchable PDF and the conversion failure page information file, and provides them to the information processing apparatus. In addition, it is common that the image forming apparatus stores job image data corresponding to a page the conversion of which has failed as a job history as image data in a format different from searchable PDF.

In the method according to the first exemplary embodiment, at the timing when the status and the detailed status information are transmitted to the information processing apparatus 102, the job history including a page that has failed to be converted into searchable PDF has not been transmitted. For this reason, the information processing apparatus 102 can quickly detect the conversion failure into searchable PDF but cannot immediately check the job history.

On the other hand, in the second exemplary embodiment, the conversion failure status file and the conversion failure page information file are also stored as the job history. As a result, after the job history is transmitted to the shared folder of the information processing apparatus 102, the information processing apparatus 102 can detect the conversion failure into searchable PDF. Thus, at the timing when the conversion failure into searchable PDF is detected, the job history in which the conversion failure into searchable PDF has occurred can be reliably confirmed.

In the second exemplary embodiment, "ImagingError" in the row number 825 as the conversion failure status file and "ErrorPageInfo.txt" in the row number 826 as the conversion failure page information file are stored in the job history. However, the contents of these files or information corresponding to the detailed status information recorded in the setting file illustrated in FIG. 4 of the first exemplary embodiment may be included in the contents of "JobInfo.xml" in the row number 821 including job information.

A third exemplary embodiment of the present disclosure will be described. In the present exemplary embodiment, a page that has failed to be converted into searchable PDF data is not saved as a file in another format but is added to the searchable PDF data as an image having no text information. The other parts are the same as those of the first exemplary embodiment, and thus only parts different from those of the first exemplary embodiment will be described.

Figure 10:
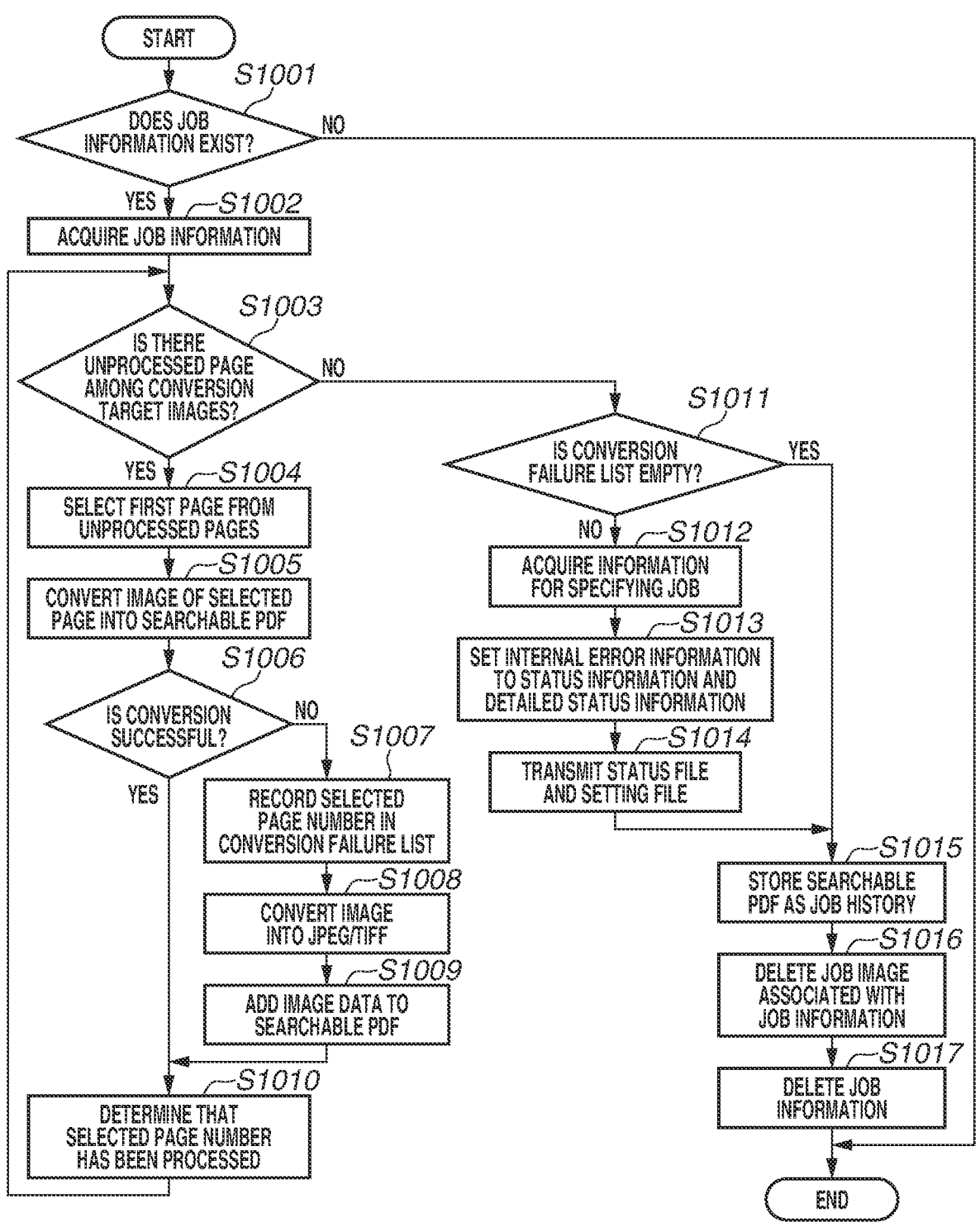
FIG. 10 is a flowchart illustrating job history generation processing of the image forming apparatus according to a third exemplary embodiment.

FIG. 10 is a flowchart illustrating job history generation processing performed by the image forming apparatus 101 according to the third exemplary embodiment. Each step illustrated in FIG. 10 is implemented when the CPU 201 of the image forming apparatus 101 reads a program of each software component illustrated in FIG. 3 stored in the ROM 202 or the storage device 204 into the RAM 203 and executes the program. Hereinafter, in FIG. 10, only processes different from FIG. 6 of the first exemplary embodiment will be described.

Processes in steps S1001 to S1007 are the same as those in steps S601 to S607, and thus descriptions thereof will be omitted.

In step S1008, the job information generation unit 304 requests the image processing unit 305 to convert the image of the page of the page number on which the conversion into searchable PDF has failed in S1005. In the present exemplary embodiment, in the conversion request, as an image format having no text information, conversion into TIFF is requested when the target image is a binary image, and conversion into JPEG is requested when the target image is a multivalued image. However, designation of the image format into which the image is to be converted and a condition of the image format into which the image is to be converted are not limited thereto.

In step S1009, the job information generation unit 304 adds the image data converted in step S1008 to searchable PDF data as a page of only image data without text information.

At this time, if the conversion of the first page of the searchable PDF data has failed in step S1005, the first page of the searchable PDF data is added in step S1009.

Processes in step S1010 to S1014 are the same as those in steps S608 to S612 in FIG. 6, and thus descriptions thereof will be omitted.

In step S1015, the job information generation unit 304 stores the searchable PDF data stored in steps S1005 and S1009 as job histories in the storage device 204 instead of the converted image data stored in step S617 in FIG. 6.

Processes in steps S1016 and S1017 are the same as those in steps S618 and S619 in FIG. 6, and thus descriptions thereof will be omitted.

The processing relating to the job history generation and the status management of conversion failure into searchable PDF according to the third exemplary embodiment has been described above. In the third exemplary embodiment, a page that has failed to be converted into searchable PDF data is added to the searchable PDF data as an image having no text information. As a result, a page that has failed to be converted into searchable PDF data first can also be viewed in the same searchable PDF data, thereby the time and effort required to open another file can be reduced at the time of inspection.

While the third exemplary embodiment has been described by modifying the first exemplary embodiment, the second exemplary embodiment may be modified as follows. After step S807 in FIG. 8, the processes in steps S1008 and S1009 in FIG. 10 are executed, and the processes from steps S813 to S816 are omitted. Then, the process in step S1015 is executed instead of step S817, and then the processes in step S818 and subsequent steps are executed. As a result, the third exemplary embodiment can also be implemented by modifying the second exemplary embodiment.

According to embodiments of the present disclosure, it is possible to store, as a job history, a record that allows the content of an image to be visually recognized at the time of inspection even for information that otherwise is conventionally lost from the job history since the conversion into an image format with text information has failed.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-187072, filed Nov. 24, 2022, which is hereby incorporated by reference herein in its entirety.

What is claimed is:

1. An image forming apparatus that executes a job, the image forming apparatus comprising:

one or more processors; and at least one memory storing executable instructions, which when executed by the one or more processors, cause the image forming apparatus to perform operations comprising:

storing image data corresponding to output processing of image data by executing a job;

storing job information corresponding to the job;

performing first conversion processing for converting images of respective pages of the image data into a first format, the first format being an image format with text information;

determining that the first conversion processing is unsuccessful based on a failure to convert an image of a first page of the image data into the first format;

recording error information indicating that the failure to convert the image of the first page into the first format has occurred;

performing second conversion processing for converting the image of the first page into a second format different from the first format based on the error information indicating the failure to convert the image of the first page into the first format, the image of the first page being converted into first converted image data in the second format by the performing the second conversion processing; and storing a job history corresponding to the job, wherein the job history includes the job information and the first converted image data as data of the first page of the job.

2. The image forming apparatus according to claim 1, the operations further comprising:

transmitting the job history and the error information to an information processing apparatus via a network.

3. The image forming apparatus according to claim 1, wherein the failure to convert the image of the first page into the first format is a failure of an optical character recognition/reader (OCR) for extracting the text information in the first conversion processing.

4. The image forming apparatus according to claim 1, wherein the first converted image data corresponding to the image of the first page converted into the second format is only generated when the failure to convert the image of the first page into the first format occurs.

5. The image forming apparatus according to claim 1, wherein the job history further includes second converted image data, in the first format, produced by successful the first conversion processing of images of one or more pages of the job other than the first page.

6. The image forming apparatus according to claim 1, wherein the second format is an image format without text information.

7. A control method in an image forming apparatus that executes a job, the control method comprising:

storing image data corresponding to output processing of image data by executing a job;

storing job information corresponding to the job;

performing first conversion processing for converting images of respective pages of the image data into a first format, the first format being an image format with text information;

determining that the first conversion processing is unsuccessful based on a failure to convert an image of a first page of the image data into the first format;

recording error information indicating that the failure to convert the image of the first page into the first format has occurred;

performing second conversion processing for converting the image of the first page into a second format different from the first format based on the error information indicating the failure to convert the image of the first page into the first format, the image of the first page being converted into first converted image data in the second format by the performing the second conversion processing; and storing a job history corresponding to the job, wherein the job history includes the job information and the first converted image data as data of the first page of the job.

* * * * *